Feb. 6, 1940.   J. C. CROWLEY   2,189,485
VALVE STEM
Filed Sept. 21, 1938
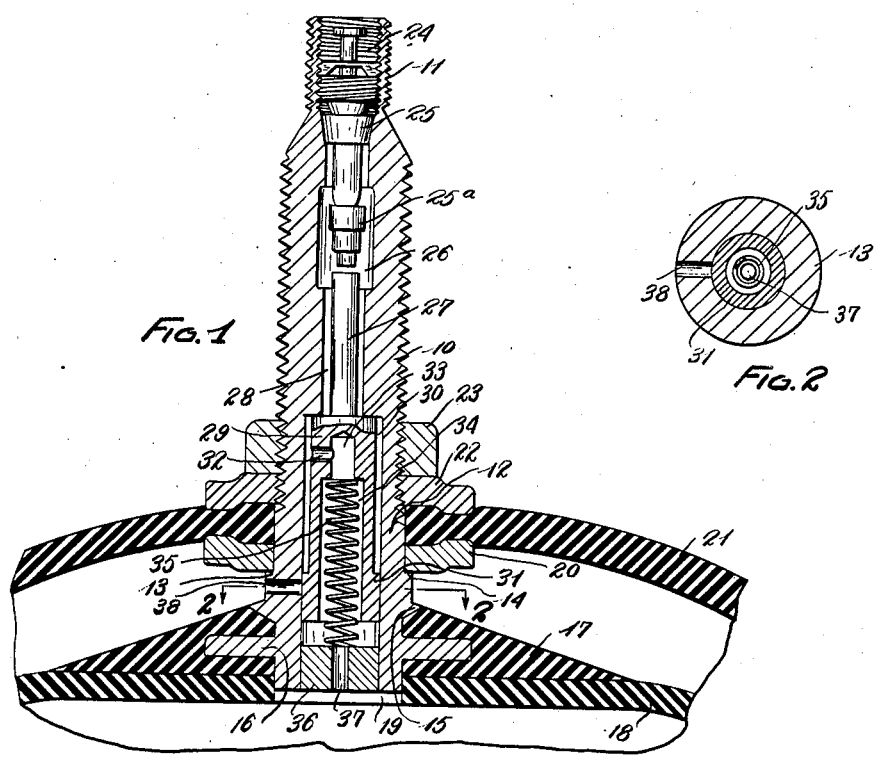
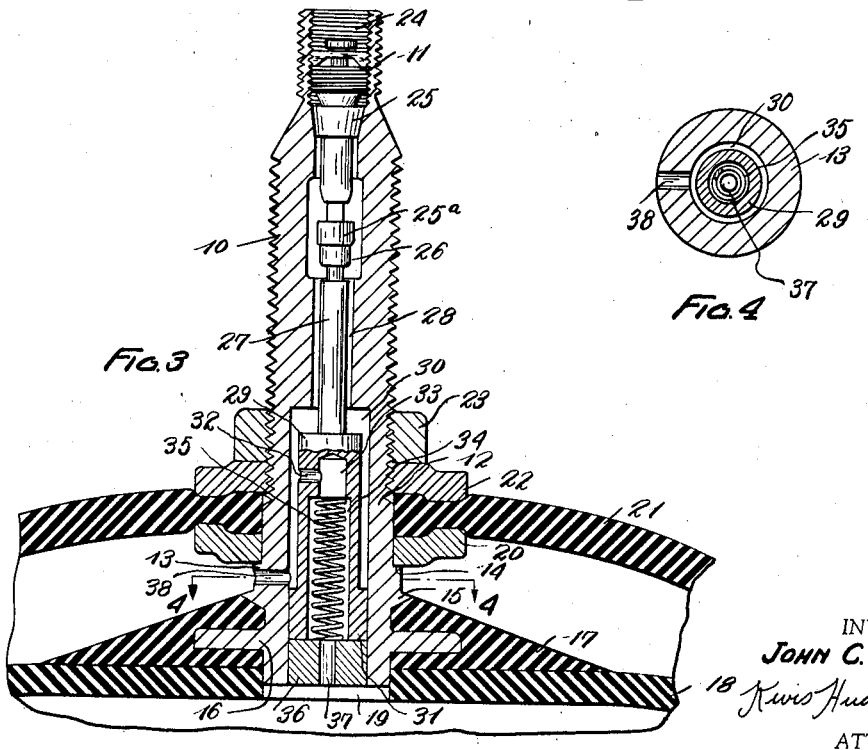
INVENTOR.
JOHN C. CROWLEY
ATTORNEYS Patented Feb. 6, 1940

2,189,485

UNITED STATES PATENT OFFICE 2,189,485

VALVE STEM

John C. Crowley, Cleveland Heights, Ohio, assignor to The Dill Manufacturing Company, Cleveland, Ohio, a corporation of Ohio Application September 21, 1938, Serial No. 231,018

4 Claims. (Cl. 152—341)

This invention relates to a valve stem and particularly to a valve stem especially adapted for use with pneumatic tire tubes of the dual or double type.

In pneumatic tire tubes of the dual type there is an outer tube member and an inner tube member arranged within the outer member and of course of smaller size than the outer member. The purpose of this arrangement is that in the event of the outer tube member "blowing out" or being punctured the inflated inner tube member will act to support the vehicle upon which the dual tube is mounted sufficiently long to prevent the vehicle getting out of control and to enable the operator to bring the vehicle to a stop.

An object of the present invention is to provide an improved valve stem for use with inflatable tire tubes of the dual type and which is so constructed that both the inner and outer tube members can be inflated simultaneously through the same valve stem, but in the event of rapid deflation of the outer tube member through puncture or blowing out the air will be retained in the inner tube member or will only escape therefrom extremely slowly, thus providing a sufficient interval of time for the operator of the vehicle to bring the same to a stop and thus prevent accidents.

A further object is to provide a valve stem of the character above specified, which is simple in construction and efficient in operation.

Further and additional objects and advantages not hereinbefore referred to will become apparent hereinafter during the detailed description which is to follow of an embodiment of the invention.

Referring to the accompanying drawing illustrating said embodiment of the invention, Fig. 1 is a longitudinal sectional view on an enlarged scale through the valve stem and through a portion of the dual tube and shows the relationship of the parts when the valve insides or core of the stem is in closed position.

Fig. 2 is a transverse sectional view taken substantially on line 2—2 of Fig. 1 looking in the direction of the arrows.

Fig. 3 is a view similar to Fig. 1 but showing the position of the parts when the valve insides or core is open, and Fig. 4 is a transverse sectional view taken substantially on line 4—4 of Fig. 3 looking in the direction of the arrows.

The valve stem of the present invention comprises a tubular exteriorly threaded portion 10, at the upper end of which is a reduced exteriorly and interiorly threaded nipple 11 for receiving a valve cap, air chuck or other similar fitting and enabling a valve insides or core to be screwed into position in the stem. The inner end of the threaded portion 10 of the stem terminates in a smooth cylindrical portion 12 at the inner end of which is an enlarged portion 13 providing a shoulder 14. At the inner end of the enlarged cylindrical portion 13 the valve stem is shown in the form of a double conical flange 15, while intermediate said flange 15 and the extreme inner end of the stem there is a relatively large annular flat flange 16. The valve stem in this instance is illustrated as having a rubber base, although it will be understood that the stem could be provided with a metal base and clamped to the inner tube member if such were desirable.

The rubber base 17 is of the usual conical formation and is molded on the inner end of the stem so as to have the large flange 16 embedded therein, while its outer surface is substantially flush with the outer conical surface of the double conical flange 15, as clearly shown in the drawing, while its inner flat surface preferably is located a short distance outwardly of the inner end of the stem.

The inner tube member of the dual or double tube is indicated at 18, and the stem is positioned on said member with its inner end extending into an opening 19 formed in the inner tube member. The rubber base 17 of the stem is vulcanized, cemented or otherwise secured to the outer side of the inner tube member as will be well understood.

A clamping collar 20 is mounted on the cylindrical portion 12 of the stem and bears against the shoulder 14 and is preferably soldered or otherwise permanently connected to the stem. The outer tube member indicated at 21 is arranged with the valve stem extending through an opening therein and with the collar 20 engaging the inner side of said member. A movable clamping plate or collar 22 is mounted on the valve stem and engages the outer side of the outer tube member 21 and is held against turning movement relative to the stem by means of diametrically opposite longitudinally extending flats formed on the threaded portion 10 of the valve stem but not shown since they are well known in the art. One or more clamping nuts 23 are screwed down on the threaded portion 10 of the valve stem and force the movable clamping collar 22 toward the fixed clamping collar 20 to securely clamp the outer tube member and the valve stem together, as is well known in the art.

The valve stem adjacent its outer end is provided with a bore indicated at 24, and shaped as is customary in valve stems to receive the usual valve insides or core indicated generally at 25 and which has a threaded portion screwing into the interiorly threaded nipple 11. The valve proper 25a of the valve insides or core extends into an enlarged portion 26 of the internal bore of the stem and the lower end of the valve is adapted to engage the upper end of a plunger rod 27 when the valve is opened and acts to depress said plunger rod inwardly of the valve stem in the manner later to become more apparent.

The plunger rod 27 has a loose fit in a bore portion 28 of the stem and its lower end, in this instance, is integrally connected with an enlarged plunger or valve member 29 that is mounted in an enlarged portion 30 of the bore through the valve stem. The inner end of the valve member 29 has an enlarged cylindrical portion 31 which slidably fits the bore portion 30, it being noted that above the cylindrical portion 31 there is a clearance between the wall of the bore portion 30 and the valve member 29. The valve member 29 adjacent its outer or upper end as viewed in the drawing, is provided with a radially extending passage 32 which communicates with the space between the valve member and the bore portion 31 and with a short recess or bore 33 formed in the valve member 29. The recess or bore 33 communicates with an enlarged counterbore 34 that extends from the bore or recess 33 to the lower or inner end of the valve member 29 and serves to house a coil spring 35 which has one end abutting against the shoulder at the upper end of the counterbore 34 and its opposite end abutting against an abutment plug 36 arranged in the lower end of the valve stem preferably by having a forced fit therein. The abutment plug 36 is provided with a centrally disposed opening or bore 37 placing the interior of the inner tube member 18 in communication with the interior of the valve stem.

In Fig. 1 the valve insides or core is shown as closed, and it will be presumed that both the inner and outer tube members of the dual tube are inflated. When the valve insides or core is closed the coil spring 35 urges the valve member 29 and plunger pin 27 upwardly until the upper end of the valve member abuts the shoulder at the upper end of the counterbore 30. At this time it will be noted that the enlarged cylindrical portion 31 of the valve member 29 closes the inner end of a radially extending port or passage 38 formed in the cylindrical portion 13 of the valve stem and in communication with the interior of the outer tube member 21. At this time, of course, the air in both the inner and outer tube members cannot escape since the valve insides or core is closed.

Assuming that it is desired to further inflate the dual tube and that an air chuck or other air line connection has been applied to the nipple 11 of the valve stem and the valve 25a of the valve insides or core unseated, it will be noted by reference to Fig. 3 that the plunger rod 27 and the valve member 29 have been moved inwardly against the tension of the spring 35 by the engagement between the lower end of the valve pin of the valve insides or core and the upper end of the plunger rod 27. The valve member is so proportioned that this inward movement thereof causes the enlarged cylindrical portion 31 of the valve member to move sufficiently far to uncover the inner end of the port or passage 38 in the valve stem and to place the interior of the outer tube member 21 into communication with the space between the valve member 29 and the wall of the enlarged bore portion 30. At the same time the interior of the inner tube member 18 is in communication through the opening or bore 37 in the plug 36, the counterbore 34, bore 33 and port or passage 32 in the valve member with the space between the valve member and the wall of the bore portion 30 of the valve stem.

It will be apparent that air entering through the valve insides or core is free to flow into both the inner and outer tube members and conversely, if it is desired to deflate these members the air may flow outwardly therefrom through the valve stem.

From the foregoing it will have been seen that both the inner and outer tube members can be inflated or deflated simultaneously through one and the same valve stem.

Assuming that the inner and outer tube members are inflated and are mounted upon the wheel of a motor vehicle, the parts of the valve stem will be in the position indicated in Fig. 1. Further assuming that the outer tube member 21 is punctured or blows out and the air is released therefrom while the inner tube member 18 remains airtight, it will be understood that the air in the inner tube member 18 cannot immediately rush into the outer tube member and thence to atmosphere, since the enlarged cylindrical portion 31 which has a sliding fit in the bore portion 30 of the valve stem is at this time covering the inner end of the passage or opening 38 in the valve stem.

While there may be some seepage of air from the inner tube member around the portion 31 of the valve member 29 and thence through the opening or port 38 into the outer tube member and to atmosphere, it will be appreciated that such seepage will be extremely slow and any deflation of the inner tube member 18 will be so gradual as to allow sufficient time for the operator to bring the vehicle to a stop.

Although a preferred embodiment of the invention has been illustrated and described herein, it will be understood that the invention is susceptible of various modifications and adaptations within the scope of the appended claims.

Having thus described my invention I claim:

1. A valve stem for dual or double tire tubes of the type having inner and outer tube members and comprising a stem proper secured to both tube members and provided with a bore therethrough, means placing said bore in communication with both tube members, valve means for sealing said bore outwardly of the first named means, and means in said bore automatically operating when said valve means is closed to interrupt the communication between said bore and said outer tube member.

2. A valve stem for dual or double tire tubes of the type having inner and outer tube members comprising a stem proper secured to both tube members and provided with a bore therethrough, means placing said bore in communication with both tube members, valve means for sealing said bore outwardly of the first named means, and means in said bore operatively controlled by the movement of said valve means for interrupting the communication between said bore and said outer tube member when said valve means is closed.

3. A valve stem for dual or double tire tubes of the type having inner and outer tube members and comprising a stem proper secured to both members and having a bore therethrough communicating at its inner end with said inner member, said stem proper being provided with a port placing said outer member in communication with said bore, valve means in said stem outwardly of said port for sealing said bore, and means in said bore operatively controlled by the movement of said valve means for closing said port when said valve means is closed.

4. A valve stem for dual or double tire tubes of the type having inner and outer tube members and comprising a stem proper secured to both members and having a bore therethrough communicating at its inner end with said inner member, said stem proper being provided with a port placing said outer member in communication with said bore, valve means in said stem outwardly of said port for sealing said bore, and a spring pressed plunger in said bore operatively controlled by the movement of said valve means and provided with a portion for closing said port when said valve means is closed.

JOHN C. CROWLEY.